US009625607B2

(12) United States Patent
Tudor et al.

(10) Patent No.: US 9,625,607 B2
(45) Date of Patent: Apr. 18, 2017

(54) NONINTRUSIVE INSPECTION METHOD AND SYSTEM OF CARGO TYPE OBJECTS: VEHICLES, CONTAINER TRUCKS, TRAIN CARRIAGES (71) Applicant: MB TELECOM LTD., Otopeni Ilfov (RO)

(72) Inventors: Mircea Tudor, Bucharest (RO); Constantin Sima, Bucharest (RO); Chirita Ionel, Bucharest (RO); Andrei Iacobita, Bucharest (RO); Emil Mielica, Bucharest (RO); Adrian Osvat, Bucharest (RO); Cristian Prioteasa, Scornicesti (RO); Adrian Bîzgan, Bucharest (RO); Ovidiu Popovici, Bucharest (RO); Anda Dobrescu, Bucharest (RO); Doru Munteanu, Bucharest (RO); Nicusor Birsan, Ploiesti (RO); Emil Studineanu, Bucharest (RO)

(73) Assignee: MB TELECOM LTD., Otopeni Illfov (RO)

( * ) Notice: Subject to any disclaimer, the term of this patent is extended or adjusted under 35 U.S.C. 154(b) by 63 days.

(21) Appl. No.: 14/416,153

(22) PCT Filed: May 20, 2013

(86) PCT No.: PCT/RO2013/000011
§ 371 (c)(1),
(2) Date: Jan. 21, 2015

(87) PCT Pub. No.: WO2015/020546
PCT Pub. Date: Feb. 12, 2015

(65) Prior Publication Data
US 2015/0219785 A1    Aug. 6, 2015

(30) Foreign Application Priority Data

May 21, 2012 (RO) .............................. A 2012-00354

(51) Int. Cl.
*G01V 5/00* (2006.01)
*G01N 23/04* (2006.01)
(Continued)

(52) U.S. Cl.
CPC .............. *G01V 5/0066* (2013.01); *G01T 7/12* (2013.01); *G01V 5/0016* (2013.01); *G06K 9/00771* (2013.01)

(58) Field of Classification Search
CPC .. G01V 5/0016; G01V 5/0008; G01V 5/0025; G01V 5/0033; G01V 5/0075;
(Continued)

(56) References Cited

U.S. PATENT DOCUMENTS

5,065,418 A * 11/1991 Bermbach ............ G01V 5/0016
250/358.1
5,642,393 A *  6/1997 Krug .................... G01V 5/0016
376/159
(Continued)

*Primary Examiner* — David A Vanore
(74) *Attorney, Agent, or Firm* — Dennemeyer & Associates, LLC (57) ABSTRACT

The present invention consists of a method and a scanning system for the nonintrusive inspection of vehicles, container trucks and train carriages, realized without direct human intervention upon the inspected object, thus eliminating time wasting activities like physical control, unsealing, etc. The proposed method for nonintrusive inspection of vehicles and containers has a high inspection capacity (up to 200 vehicles per hour), by achieving a complete vehicle radiography (except the driver's cabin), while driving through a scanning portal, geometrically optimized to be transported rapidly in ISO standardized containers using conventional transport systems (airplane, ship, train, or terrestrial on public roads).

(Continued)

The system which implements the method presented earlier is constituted from a mobile scanning unit and a mobile control center which is positioned outside the exclusion area "a" which remotely command all the processes involved in the nonintrusive inspection.

4 Claims, 9 Drawing Sheets (51) Int. Cl.
*G01T 7/12* (2006.01)
*G06K 9/00* (2006.01)
(58) Field of Classification Search
CPC ........ G01N 23/00; G01N 23/04; G01N 23/02; G01N 23/046
USPC ............... 378/57, 196, 198, 62, 90, 197, 87; 250/358.1, 359.1, 336.1, 390.02, 395
See application file for complete search history.

(56) References Cited

U.S. PATENT DOCUMENTS

| | | | | | |
|---|---|---|---|---|---|
| 5,692,028 A | * | 11/1997 | Geus | .................... | G01V 5/0008 378/196 |
| 5,764,683 A | * | 6/1998 | Swift | .................... | G01N 23/04 378/196 |
| 5,838,759 A | * | 11/1998 | Armistead | ............ | B66C 19/007 378/57 |
| 6,031,890 A | * | 2/2000 | Bermbach | ............ | G01V 5/0016 378/206 |
| 6,151,381 A | * | 11/2000 | Grodzins | ................ | G01N 23/04 378/57 |
| 6,542,580 B1 | * | 4/2003 | Carver | ................. | G01V 5/0008 378/57 |
| 6,727,506 B2 | * | 4/2004 | Mallette | ............... | G01V 5/0075 250/336.1 |
| 6,785,357 B2 | * | 8/2004 | Bernardi | .............. | G01V 5/0008 378/193 |
| 7,460,639 B2 | * | 12/2008 | Tudor | ................... | G01V 5/0016 250/359.1 |
| 7,742,568 B2 | * | 6/2010 | Smith | .................. | G01N 23/087 378/57 |
| 8,859,981 B1 | * | 10/2014 | Stoian | .................. | G01V 5/0008 250/395 |
| 9,352,851 B2 | * | 5/2016 | Tudor | ................... | G01V 5/0008 |
| 2004/0251415 A1 | * | 12/2004 | Verbinski | ............... | G01N 23/02 250/358.1 |
| 2004/0256565 A1 | * | 12/2004 | Adams | ...................... | G01T 3/06 250/358.1 |
| 2005/0105665 A1 | * | 5/2005 | Grodzins | ................. | G01T 3/06 376/157 |
| 2015/0219785 A1 | * | 8/2015 | Tudor | ................... | G01V 5/0016 378/57 |

* cited by examiner

NONINTRUSIVE INSPECTION METHOD AND SYSTEM OF CARGO TYPE OBJECTS: VEHICLES, CONTAINER TRUCKS, TRAIN CARRIAGES

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of Invention

The present invention consists of a method and system for the nonintrusive inspection of vehicles, container trucks and train carriages. The inspection can take place without direct human intervention on the inspected object, thus eliminating time-consuming activities such as actual physical control, unsealing, etc.

Using the proposed invention a radiographic image of the inspected object is achieved, image upon which a specific trained operator can evaluate the quantity and the nature of the goods that were loaded onto the scanned object. By analyzing the radiographic images, the detection of contraband tentative, the illegal transport of forbidden or undeclared products (like drugs, explosives and weapons) can be achieved, as well as counter terrorist protection at the access point of the inspected vehicles in strategically marked zones which require a high level of security, like: airports, maritime and fluvial harbors, border crossing points, conflict zones or military bases.

With the purpose of nonintrusive control several scanning methods are known, scanning methods in which the following radiation sources are used:
  Gamma radiation sources, generated naturally by encapsulated radioactive material like: Cobalt, Cesium, etc.;
  Linear accelerator of X-ray, gamma radiation or neutrons.

The nonintrusive inspection system principle implies the irradiation of a row of detectors linearly placed in front of a beam of penetrating radiation, thus forming a radiation tunnel, tunnel which is moving relative to the scanned object. The electrical signals emitted by the detectors are processed analogically/digitally with the purpose of generating, line by line, a radiography which will be displayed on a PC screen. The signal intake and processing generated from a large number of detectors, usually hundreds, implies complex electronic blocks and a network of wires with a large number of parallel connections between the boom and the subsystems that generate a radiographic image.

The relative movement between the scanned object and the scanning system is being accomplished either by moving the mobile object through a fixed scanner or by moving the mobile scanner around the fixed object.

The whole process of operating such systems is accomplished from a control cabin, located on the scanning system, control cabin for which extensive radiation shielding is mandatory. This method presents the drawback of professional radiation exposure of the operators.

DESCRIPTION OF RELATED ART INCLUDING INFORMATION DISCLOSED UNDER 37 CFR 1.97 AND 1.98

Currently the worldwide market offers several scanning systems which include, in various combinations, the technologies presented above. Among these systems are the GaRDS scanning system with gamma radiation manufactured by the American company RAPISCAN SECURITY PRODUCTS and the mobile X-ray scanning system HCVM L produced by SMITHS DETECTION. In both cases, as well as the majority mobile scanning systems known up to date, the operators' cabin is mounted on the chassis of the scanner, thus exposing the working personnel to professional and accidental irradiation risks, risks which are eliminated using the present invention by installing the operator cabin on a mobile towing unit, unit which is placed outside the exclusion area during the scanning process, unit which controls remotely all the processes through radio communication.

Another major difference that sets the present invention apart from the known systems, including GaRDS and HCVM L which require a driver to operate the scanning unit, is that the present invention eliminates this necessity by implementing an automated control system of the direction and safety distance from the scanned object.

Other disadvantages of the said known systems are their weight and installation on chassis that support heavy loads. The HCVM L system manufactured by SMITHS DETECTION has a 3-axle chassis that supports a load of 25 tones, while the MT1213LC system manufactured by the Chinese company NUCTECH uses a 4-axle chassis that supports a load of over 25 tones.

The process of operating the said systems is very complicated, process which requires a 3 person shift (minimum 2 on the HCVM L, because the driver can also be a data operator): the data operator, the driver and the external supervisor; the said external supervisor has the responsibility to control the traffic from and into the exclusion area, as well as prevent any intruders from stepping into the exclusion area, where there is a radiation hazard.

The known scanning systems, like GaRDS and HCVM L, have a large axle load, both in operating and transport mode keeping in mind that the maximum allowed dimensions for transport on public roads is 18 m×2.5 m×4 m. Taking into consideration these conditions, the systems such as the ones presented earlier cannot be shipped, transported by train, by airplane or on a road because all these methods of transportation would require loading into ISO standardized containers. Generally, mobile scanners are designed to be auto transported on relatively short distances, only on public roads or only on those roads that support a heavy axle load. Existing systems must be disassembled and then loaded for transportation in standardized containers, but this is a time-consuming process and it implies technical knowledge that the system users usually do not possess, practically making impossible the rapid transportation in areas with high security requirements like conflict zones or portable military bases. Apart from the known systems, the present invention displays the advantage of facile transportation by airplane, by ship, by train or on public roads into a standardized ISO container and that the set-up time is approximately 5 minutes from arriving on site (set-up being conducted by an average user) in comparison with the known systems, like GaRDS or HCVM L which are reassembled after transport and ready for scanning in a process that can last several days, said process that demands highly trained personnel.

Another major disadvantage of known nonintrusive inspection systems is the time frame allocated for one scanning which eventually leads to a low number of scanned vehicles and containers in any given time. This major limitation blocks the flow of goods which transits harbors or border crossing points inducing waiting time, as the majority of known mobile inspection systems only support a maximum capacity of 30 scanned vehicles per hour. Let's take the example of Singapore and Hong-Kong which are the no. 2 and no. 3 busiest harbors in the world when it comes to container flow, annually in said harbors enter over 27 million, respectively 24 million containers that require scanning, with a total number of 12, respectively 8 scanners (source: Global Logistic Chain Security—survey conducted in 2007). Even if these scanners would work at full capacity (24 hours per day, 365 days per year) only 10% of the total number of containers would be scanned, and the equipment found in the majority of harbors in the world is far less inferior to the harbors named above.

According to the World Shipping Council (WSC), in May 2011 the total number of containers in circulation was approximately 18.605 million units which is equivalent to 28.535 TEU (1 TEU represents the cargo capacity of a standard intermodal container, 20 feet –6.1 m long and 8 feet –2.44 m wide) and considering the total number of nonintrusive inspection systems (1250 globally at the end of 2007, according to a study conducted by the University in Le Havre and ordered by the World Customs Organization-WCO) there is a scanning capacity of 3% of the containers in small harbors and 0.1% in large harbors statistic which applies at European level (according to "European Commission Staff Working Paper—Secure and 100% Scanning of containers, February 2010"). So, the majority of containers and vehicles are not scanned because of lack of actual time, instead a small number of containers are inspected randomly.

The present invention through its characteristics: high level of mobility, capacity to be loaded into an ISO standardized container and transported at global scale rapidly, and efficiency—the capacity to scan over 200 vehicles per hour, can be a solution for increasing the level of security in harbors that export goods to the United States of America, country that has adopted in 2007 a special legislation (Second Line of Defense—SLD), mandating the scanning of 100% of containers that enter the country by maritime transport, legislation that needed to be implemented by the 1 Jan. 2012. Meanwhile, the economic climate has made it impossible to enforce this legislation, USA setting new objectives, for example to equip over 650 locations from approximately 30 countries with radiation detection equipment (until 2018) and to supply over 100 harbors with nonintrusive inspection systems, making it possible to scan 50% of maritime traffic worldwide (according to the website of the US Radiation and National Security, 2011).

The technical issue that is dealt by the present invention is the realization of a nonintrusive inspection method for vehicles and containers, with high inspection capacity (up to 200 vehicles per hour), by obtaining a complete radiography of the vehicle, except for the driver's cabin, while said vehicle is being driven by its driver through the scanning tunnel and the realization of a system that implements the above method, said system being geometrically optimized so that it can be rapidly transported in ISO standardized containers using conventional transport systems (by air, by train, by ship or on public roads) onto areas which demand the assurance of a high security rate.

The nonintrusive control method, according to the invention, eliminates the disadvantages mentioned above by that the vehicle currently inspected gains access in the scanning area defined by the exclusion zone protection subsystem through the automatic traffic management subsystem that automatically commands the operation of an external display system that reads the current speed of the vehicle, as well as displays the optimum speed for accurate scanning. The vehicle is driven by the driver inside the scanning area, passing through a scanning structure, referred to from now on as the portal. The aforementioned portal has on one side a low intensity radiation source and on the other side an area with radiation detectors. The vehicle should approach the portal with a recommended speed, said speed which is displayed on the external display system that the driver has visual access to. The speed is measured by a speedometer located on the portal or in its vicinity. The radiation source is activated if the vehicle is running at a recommended speed in the vicinity of the portal and the end of the cabin is detected using a specialized system. Scanning is stopped automatically when: the scanned vehicle has passed completely by the extremity of the boom that holds the detectors, intruders are caught entering the exclusion area, the proximity sensor is triggered, said sensor which transmits an alarm signal when the distance between the detector boom and the scanned vehicle is dangerously small, when the vehicle's speed is below a preset limit and vehicle scanning below this limit may affect the passengers' health and when the vehicle's speed is over the maximum allowed limit, limit which the scanning system cannot manage. The scanning process can be stopped manually by the operator at any given time. During the scanning process, the resulting image of the inspected vehicle is displayed on the operator's screen simultaneous and synchronized with the vehicle's movement. At the end of the scanning phase, the automatic perimeter protection system of the exclusion area is deactivated right after the radiation source is deactivated.

The radiation source used in the nonintrusive inspection system, according to the invention, can be a natural source with radioactive material, X-Ray generator or a linear accelerator. When using a natural source, the material choice (in this case Co60—double encapsulated with emitted photon energy of 1.17 Mev and 1.33 MeV, and a source activity of 1 Currie) is decided according to the level of penetration desired and the dimensions of the exclusion area available in the scanning location. The capsule that contains radioactive material is sealed in a container which has sufficient shielding, so that the degree of radiation on the exterior surface of the container is within the limits established by the International Atomic Energy Agency (IAEA). The radiation screen is provided with a slot with an angular opening, said slot designed to generate a beam of radiation with an angular opening of 70 degrees, collimated at an approximately 18 cm width when the source is placed at 4.3 meters from the detector beam. The drive system used for conveying the source-port rods into open-source position must insure an automatic withdrawal of the radioactive capsule into closed-source position in order to stop radiation emitting when a malfunction arises, said malfunction of the scanning system or of the drive system itself. The open-source position of the port-source rods, respectively the radiation tunnel initialization is acoustically and optically signaled so that the operator and any other persons nearby can be warned in case there is radiation outside the exclusion area. Using this type of radiation source, penetration can reach up to 180 mm in steel. The natural radiation source has 5 year warranty for a daily use, 365 days per year and 24 hours per day. During the scanning process, when the vehicle passes through the portal, with at least 10 km/h, the radiation doze which the driver and the passengers are exposed to, is very low, up to 0.078 μSv per scan.

When using an X-ray generator, with a maximum photon energy of 250 keV, attenuated using a 0.4 mm Fe/Ni/Co filter and an additional Al filter of 4 mm, at an 1 mA anodic power intensity, the integrated dose of radiation received by the driver, per scan is also 0.078 μSv. The control system of the radiation beam is based on the dual-control with redundancy principle and includes:

Electrical control based on turning the electrical power on/off;

Electromechanical control for blocking the collimator's beam using an actuator that shuts the shutter's shield; this shield allows turning on and off the radiation beam easily, minimizing the time frame between the end of the cabin detection and the commencing of the scanning process; this way the whole container is being scanned without any image loss; in case of an accidental power outage, the radiation will be shutdown in less than 10 milliseconds.

In comparison, the radiation absorbed during a New York-Los Angeles flight (Approx. 8 hours) is between 20 and 50 μSv, while during a chest X-ray the radiation doze absorbed by the patient is about 100 μSv. During a brain tomography the same patient receives an 1100 μSv radiation dose. The radiation dose that the population should be exposed to outside any exclusion area is maximum 1000 μSv per year (according to CNCAN NSR 01—the National Committee for Nuclear Activity Control), dose which is equivalent to 35 scanning processes per day, every day, 365 days/year using the present invention.

Using another control method, vehicles waiting in stand-by to be scanned, stop at the barrier at the entrance of the exclusion area, the drivers hand out the documents attached to the transport to the operator located in the mobile control center (MCC), afterwards the barrier is lifted, the traffic light turns green and the vehicle is authorized to enter the exclusion area, said area whose perimeter protection deactivates. The drivers park the vehicles sequentially, in a column in the marked scanning area and then leave the said area. Perimeter protection activates, and the operator from the MCC initializes the scanning process OTA—over the air—by transmitting orders to the mobile scanning unit (MSU). The radiation source is activated and the reduced speed movement of the MSU by the column of vehicles is initiated. Scanning is stopped automatically when: the detectors boom has passed the vehicles extremity, by the end of the before programmed scanning length, intruders enter the exclusion area, the limiting systems that detect a maximum scanning length are triggered or the proximity sensor that transmits an alarm when the distance between the boom and the scanned vehicle is getting to small is triggered. At the end of the scanning cycle the documents attached to the transport are scanned, the information is saved in a database and the resulting image is displayed on the operator's screen, said operator localized in the MCC, and the perimeter protection of the excluded area is automatically deactivated. Drivers receive their documents back, go back to their vehicles, the exit barrier is lifted, the exit traffic light turns green, the vehicles leave the exclusion area, the mobile scanning unit returns to its initial position, the barrier lowers and the scanning cycle can be resumed.

The system that implements the method presented above consists of a scanning unit installed on a vehicle's chassis that holds a boom provided with some areas of detectors specific to the type of radiation being used. In transport mode, the boom is folded to insure a minimum size that allows the enrollment of the vehicle in the authorized dimensions of public road transport and in fitting the system into and ISO standardized container. By folding the boom, the total weight is distributed optimally on every wheel. In scanning mode, the boom extends forming a shape similar to the reversed letter "U", which holds the radiation source on its inferior end, parallel with the detector area.

The boom deployment is executed automatically by hydraulic cylinders commanded by a programmable logic controller (PLC) through some hydraulic proportional valves. In order to counterbalance the boom's weight, before the reconfiguration of the system from transport mode to scanning mode, an auxiliary wheel, positioned at the base of the detector boom, is lowered automatically on the ground using a hydraulic piston. The mobile scanning unit also consists of a position monitoring subsystem and a hydraulic transmission subsystem that control the low speed movement of the overall mobile scanning unit. The scanning system also has a mobile control center (MCC) that is positioned outside the exclusion area and has the role to remotely manage all the processes involved in the nonintrusive inspection. Inside the mobile control center there is an acquisition, processing, storage and display of the radiographed image system. The scanning system also includes a perimeter protection system and an automated traffic management subsystem.

The mobile scanning unit is equipped with a supplementary chassis, referred to from now on as superstructure, said superstructure that has a boom stabilizing system mounted in a joint that allows the rotation in a perpendicular plan with the transversal axis of chassis. The detector boom is constituted of 3 segments: the fixed segment, referred to from now on as fixed segment the mast which is fixed on the stabilizing system, the "C" shaped segment known as the rotary segment which is fixed onto the mast from one end of the "C" shape in a 2 degree joint and the segment located at the other end of the "C" shaped segment, caught in a 1 degree joint, segment known from now on as the final segment, said final segment that supports at its other end the penetrating radiation source. The mast and the rotary segment are provided with detectors mounted on a metallic stand on the boom's length. In transport mode, the detector boom is folded in a letter "C" shape, along the chassis, by the following sequence for converting into scanning mode:

The auxiliary wheel, which is positioned at the basis of the detector boom, is automatically lowered on the ground, movement which is realized by a hydraulic piston, said wheel which undertakes a part of the chassis' weight.

The final segment is blocked in an electromagnetic lock, in vertical position, solidary with the superstructure;

The rotary segment, said segment which is "C" shaped, executes an unfolding motion around the fixed mast and the final segment, said segment which is fixed in an electromagnetic lock, arriving in a vertical position, in the same plan as the mast, forming a 90 degree angle between the chassis' plan and plan generated by the boom segment holding the radiation source, the boom having an upside down "U" shape;

The final segment is released from the electromagnetic lock, said lock which kept it solidary with the chassis, and then locked together with the rotary segment by another electromagnetic lock;

The rotary and the final segment execute a rotating motion around the mast, up to 90 degrees from the initial position, in a horizontal plan, so that the system unfolds the boom in an upside down "U" shape, by the chassis, thus finalizing the system deployment to scanning mode.

The detector boom stabilizing system engages, in a rotating motion in a vertical plan, perpendicular on the transversal axis of chassis, the boom ensemble, said ensemble which is fixed on the stabilizing system. The boom can thereby remain fixed from the scanned object, in a vertical plan, regardless of the surface that the mobile system is driven on, by using an inclinometer for measuring the boom's level of inclination and engaging the auxiliary wheel through the hydraulic piston, so that the horizontal part of the boom maintains a plan during operation, regardless of the road surface. This stabilizing system, referred from now on as image stabilizer has an impact on the radiography's linearity, generated by the scanning system, eliminating geometrical aberrations from the image, aberrations generated by the road surface of the scanning site.

The hydraulic transmission subsystem used for the low speed movement of the chassis is located on the chassis, between the gearbox and the traction deck and is powered by the drive shaft which is connected to the gearbox, which engages the drive shaft connected to the differential group located on the traction deck. The subsystem is provided with mechanical switch box for activating the system and has a tachometer sensor, a hydraulic motor, a hydraulic pump with variable flow controlled by an electronic module, said subsystem which is controlled by a specialized software application for automated movement control.

The acquisition, processing, storage and radiographed image display subsystem is composed of amplifier decks to which the detectors connect, multiplexing decks, analog-digital converters, controllers, an Ethernet data bus, Ethernet switches which concentrate the signals and transmits them to the processing unit which runs a specialized software application connected through a LAN network with another processing unit which runs another software application, said application which is specialized in displaying the scanned vehicle's image on a screen.

The nonintrusive inspection system assures the integrity and the authenticity of the documents belonging to the scanned vehicle, audio and video surveillance of the scanning perimeter and saving the complex data files in digital format, saved files which contain the inspection's result, in an electronic folder under a unique identifier. As an option, a video image from under the vehicle can be captured.

By applying this invention, the following advantages are obtained:

The high scanning capacity in a small period of time (up to 200 transport vehicles and 500 light vehicles);

Low radiation dose absorbed during a scanning process by the person driving the vehicle, a dose that does not surpass 0.078 µSv, in the drive-through scanning version;

Complete inspection of the vehicle, including the driver's cabin, in any scanning version;

Illegal immigrants detection without any threat on their health;

The possibility to load the system into an ISO standardized high cube container for rapid and secure transport by plan, ship, train or public road transport, worldwide, wherever necessary (unique feature for a mobile system);

The professional irradiation risk of the operators is eliminated as well as the accidental irradiation risk of the possible intruders into the exclusion area;

Elimination of all risks of victims in case the inspected vehicle explodes;

The necessary number of operators is reduced from 3 to only 1 per shift;

The image stabilizer which controls the horizontal position of the boom regardless of the chassis' movement;

High system mobility, flexibility and handling;

High automation level;

High productivity rate, by scanning up to 200 vehicles per hour by automating processes and reducing dead times by the computerized administration of the processes.

Accurate speed and distance control of the scanning system;

Conserving the dynamical performances of the chassis, in transport mode;

The total weight of the system is significantly reduces, with positive effects in lowering the rollover chance and in the torsional requests from the chassis. The total weight of the mobile scanning unit is 5.2 tones and 1 tone for the mobile control center, thus making the ensemble the lightest on the market;

The nonintrusive control method, according to the invention, in drive-through mode, is performed following:

The perimeter protection of the exclusion area is activated;

The operator from the mobile control center initiates the scanning process by engaging the mobile scanning unit, used as a portal structure;

The speed measuring system of the vehicles approaching the portal and the traffic management system are activated;

A photo of the front side of the vehicle is taken when a vehicle is approaching the portal area, the radiation source is activated and the vehicle travelling with a speed of 10-15 km/h is scanned;

The scanning process is stopped automatically in the following situations:
  When a person enters the exclusion area;
  When a proximity sensor is triggered, which transmits an alarm signal when the distance between the detector boom and the scanned vehicle is dangerously small;
  When the scanned vehicle's speed drops below 10 km/h, which would lead to exposing the driver and the passengers to a higher radiation dose;
  When the scanned vehicle's speed rises beyond 15 km/h, which leads to a low scanned image quality;
  When the vehicle has completely passed through the portal;

The radiography generated is displayed on the operator's screen from the mobile control center;

A folder with a unique ID is created and archived, said folder which contains the scanned image and the real image of the vehicle.

The nonintrusive control method, according to the invention, in sequential scanning mode, is performed following:
- the vehicles that are to be inspected are brought up to the entry barrier in the scanning area;
- the drivers of the vehicles step out of the vehicle and hand over the transport's documents to the operator in the mobile control center;
- entry in the scanning area is allowed, the entry barrier is raised and the entry traffic light is switched on green, and the exclusion area protection subsystem is deactivated
- the drivers position their vehicles in a column, in the scanning area, in the marked spot and leave the exclusion area;
- the perimeter protection of the exclusion area is activated;
- the operator, initiates the scanning process from the control center by radio transmitting the command to the mobile scanning unit;
- the radiation source is activated and the slow motion of the scanning unit is initiated. The system moves rectilinear with constant speed along the inspected vehicles. The speed of the unit is controlled automatically by electronic and informatics modules on board the mobile scanning unit. These modules are radio connected, through radio modem in the LAN with the control center from which they receive commands and to which they send feedback;
- the scan is automatically stopped in the following situations:
  - if the detector boom passed the inspected vehicles' extremity, so the imaging system receives a series of white lines meaning maximum level of radiation on all detectors;
  - at the end of the programmed scanning length;
  - if the maximum movement limitation system has been triggered;
  - if the exclusion area has been breached;
  - when the proximity sensor that measures that distance between the detector boom and the inspected vehicle is triggered signaling dangerously small distance;
- all documents regarding the transport are scanned and stored in a database;
- the radiography of the vehicles is displayed on the monitor in the control center;
- at the end of the scanning phase, the protection perimeter of the exclusion area is deactivated;
- the drivers of the inspected vehicles receive back the transport's documents;
- the exit barrier raises, the exit traffic light turns green and the vehicles leaves the area;
- the mobile scanning unit returns to its initial position;
- the exit barrier closes and the cycle can be restarted;
- a file that contains the radiography and the real images of each vehicle as well as copies of all documents concerning the transport is created and stored with a unique identity.

BRIEF DESCRIPTION OF THE SEVERAL VIEWS OF THE DRAWINGS

Further is presented an example of implementing of the invention in connection with the figures from 1 to 13 that describe.

DETAILED DESCRIPTION OF THE INVENTION

Figure 1:
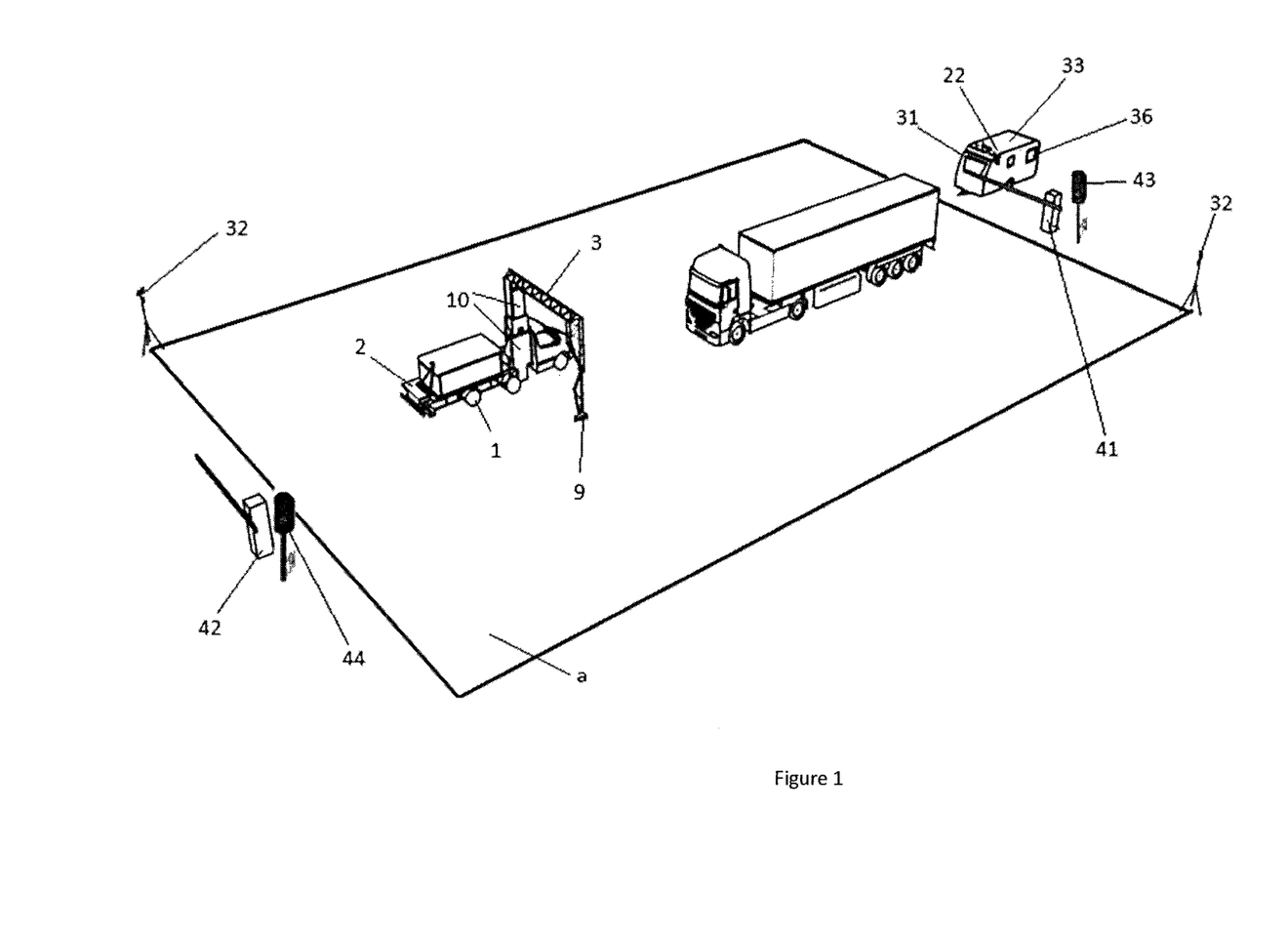
FIG. 1, perspective view of the nonintrusive inspection system, according to the invention, placed within the exclusion area.
Figure 2:
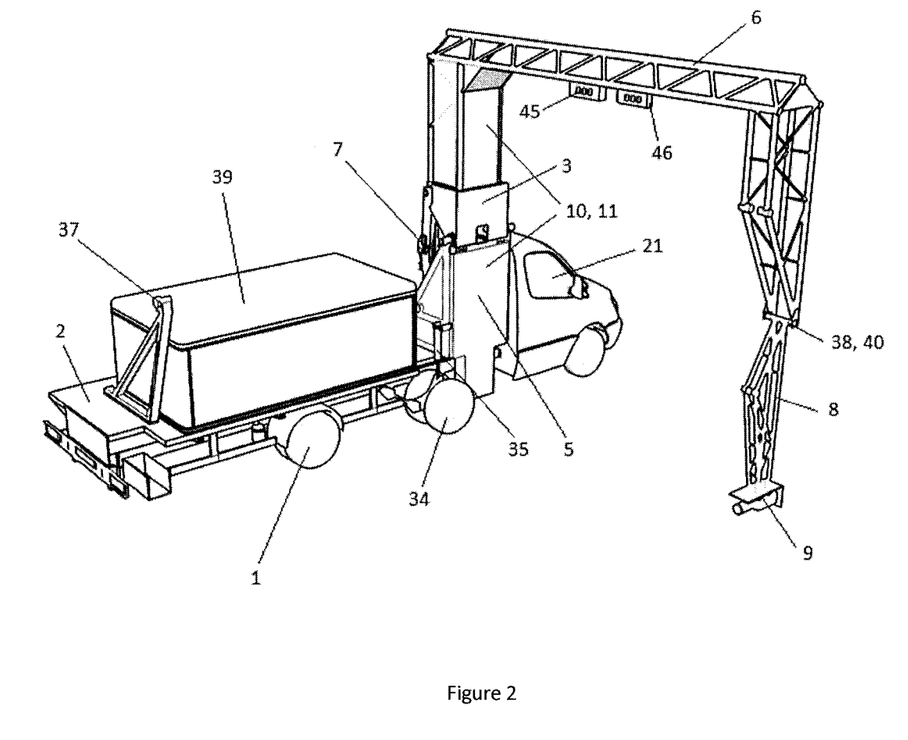
FIG. 2, perspective view of the mobile scanning unit in scanning mode.
Figure 3:
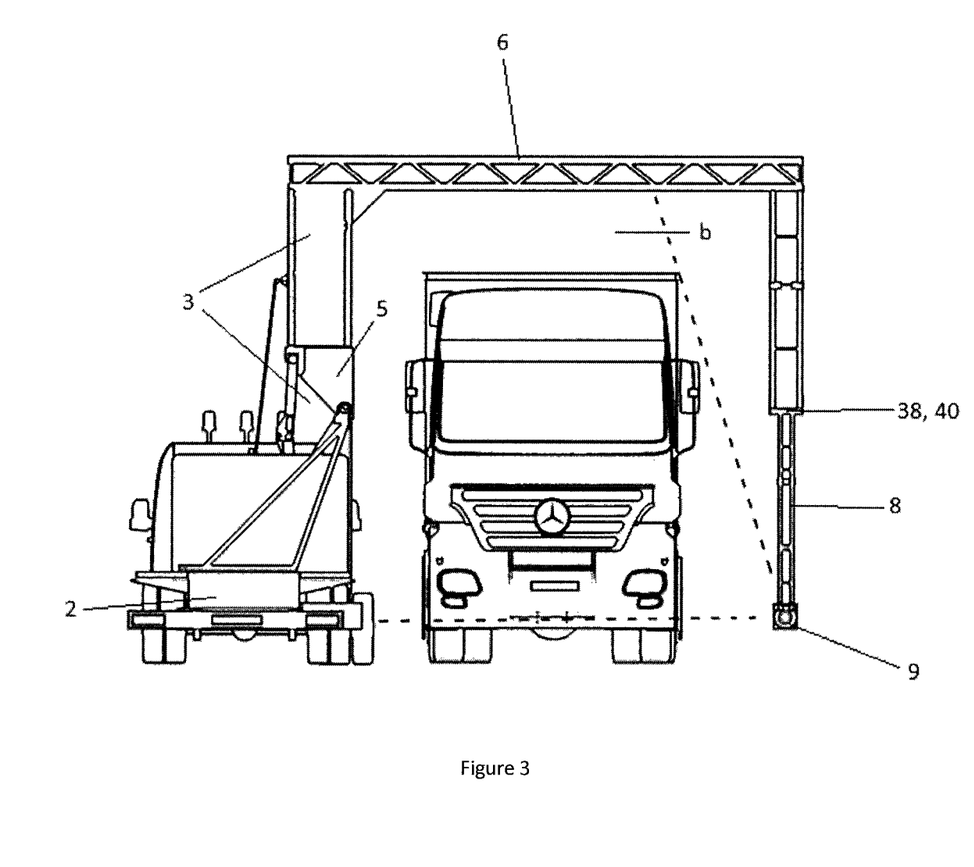
FIG. 3, rearview of the mobile scanning unit in scanning mode.

The nonintrusive inspection system, according to the invention, is a mobile nonintrusive scanning ensemble, installed on a vehicle's chassis 1 with low total weight, that has a supplementary chassis, referred from now on as a superstructure 2, onto which a stabilizing system of the detector boom 3 is installed in a joint 4 that allows the rotation in a perpendicular plan with the transversal axis of the chassis. The detector boom 3 is made of steel and light metals and is composed of 3 segments: the fixed segment—the mast 5, the "C" shaped rotary segment 6 which is fixed from one end of the "C" shape in a 2 degree joint 7, and the final segment 8 which supports at its inferior end the penetrating radiation source 9. The mast and the rotary segment are provided with a detector area 10 mounted on a metallic stand 11 on the whole length of the segments.

Figure 7:
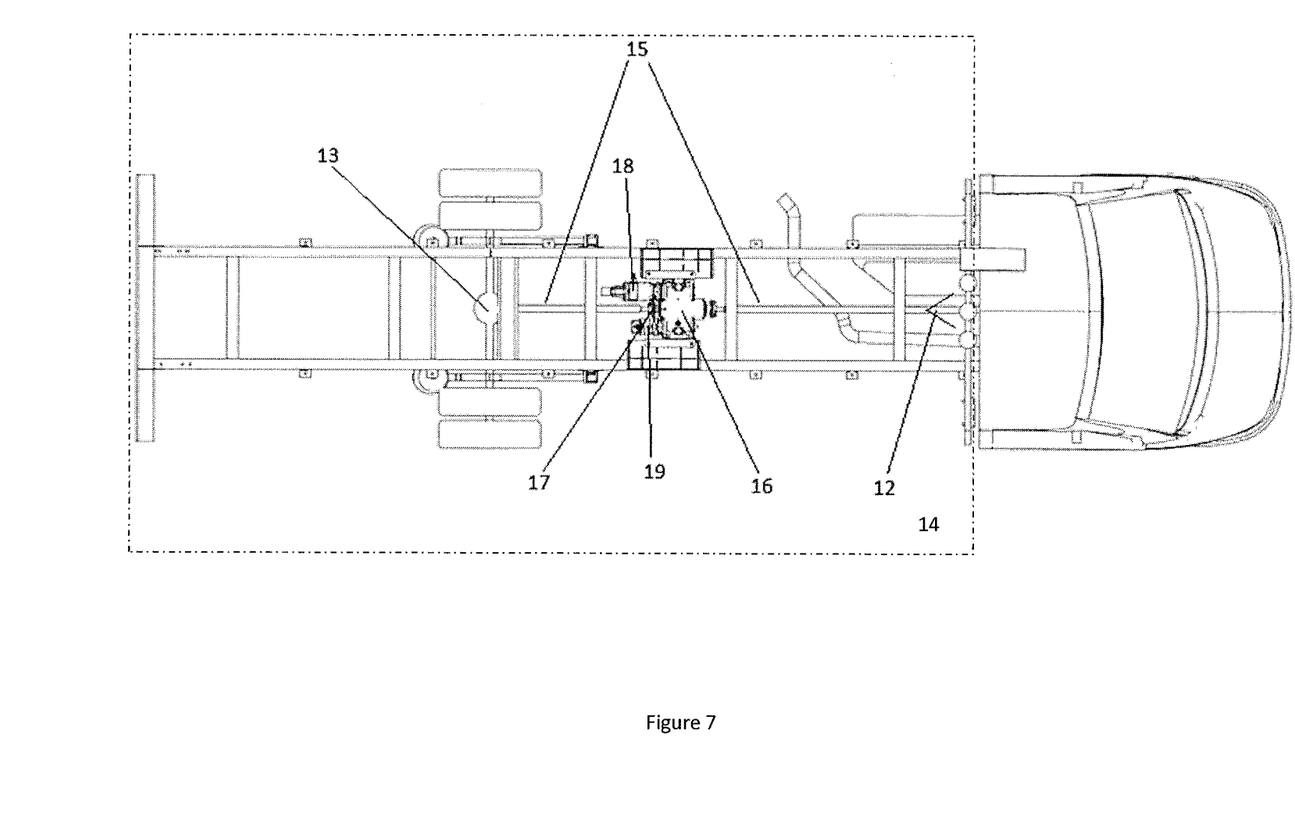
FIG. 7, overview of the hydraulic transmission system schematics.

On the chassis, between the gearbox 12 and the traction deck 13, the subsystem for hydraulic transmission 14 is located, said subsystem responsible for the low speed movement of the chassis 1 and which is operated by the drive shaft 15 which is connected to the gearbox 12 and to the differential group from the traction deck 13. The subsystem is also provided with a mechanical switching box 16 for activating the system, a tachometer sensor 17, a hydraulic motor 18, a hydraulic pump 19 with variable flow controlled by an electronic module 20 and operated by a specialized subsystem for the automatic speed and direction control 21.

Figure 8:
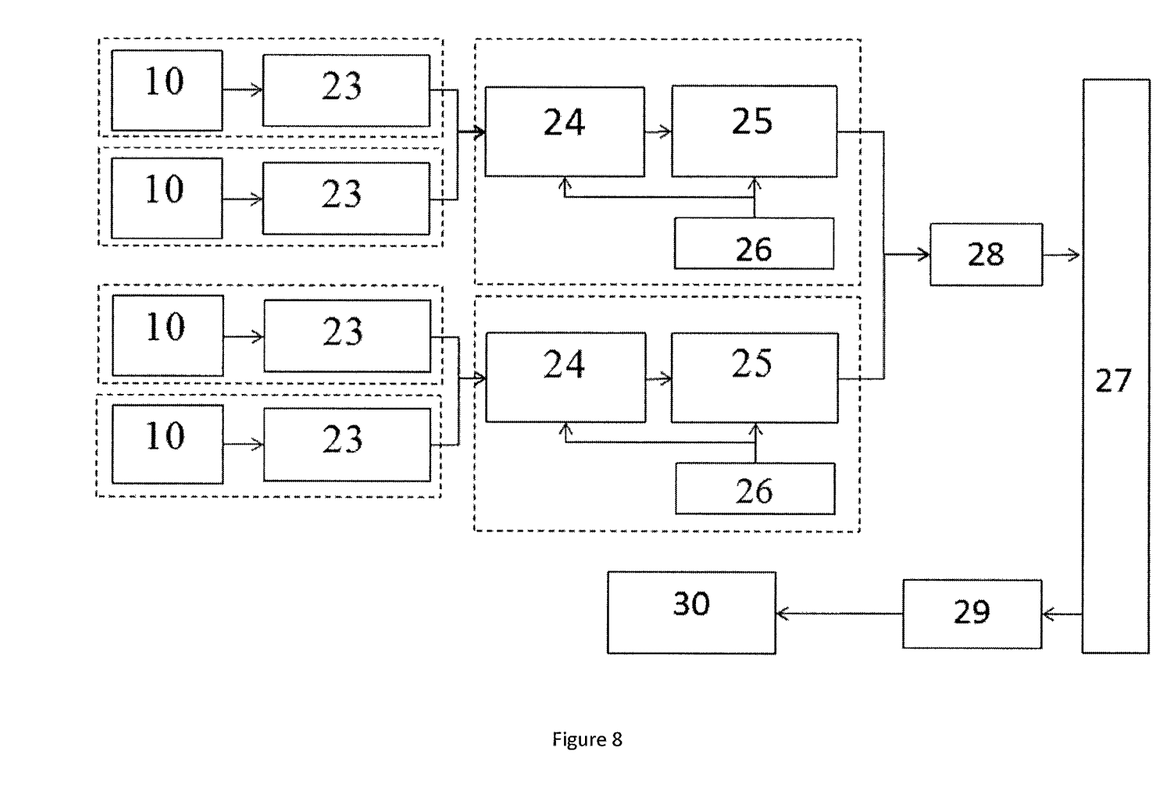
FIG. 8, block diagram of the imagistic system.

The acquisition, processing, storage and radiographed image display subsystem 22 is composed of some amplifier decks 23 which are connected to the detectors 10, some multiplexer decks 24, some analog-digital converters 25, some controllers 26, an Ethernet data bus 27 and some Ethernet switches 28. The subsystem receives the data signals from the detector areas mounted on the detector boom 3, it processes, digitizes and transmits them via a radio modem 29 to the processing unit 30 which runs a specialized software application, said unit situated in the mobile control center 31, where a radiography of the scanned object is displayed. This image is analyzed by the operator and stored on a memory support.

Because the scanning area of the vehicles has to be actively protected against the accidental irradiation of the possible intruders, a perimeter protection subsystem 32 has been provided that determines a rectangular exclusion area a.

Figure 9:
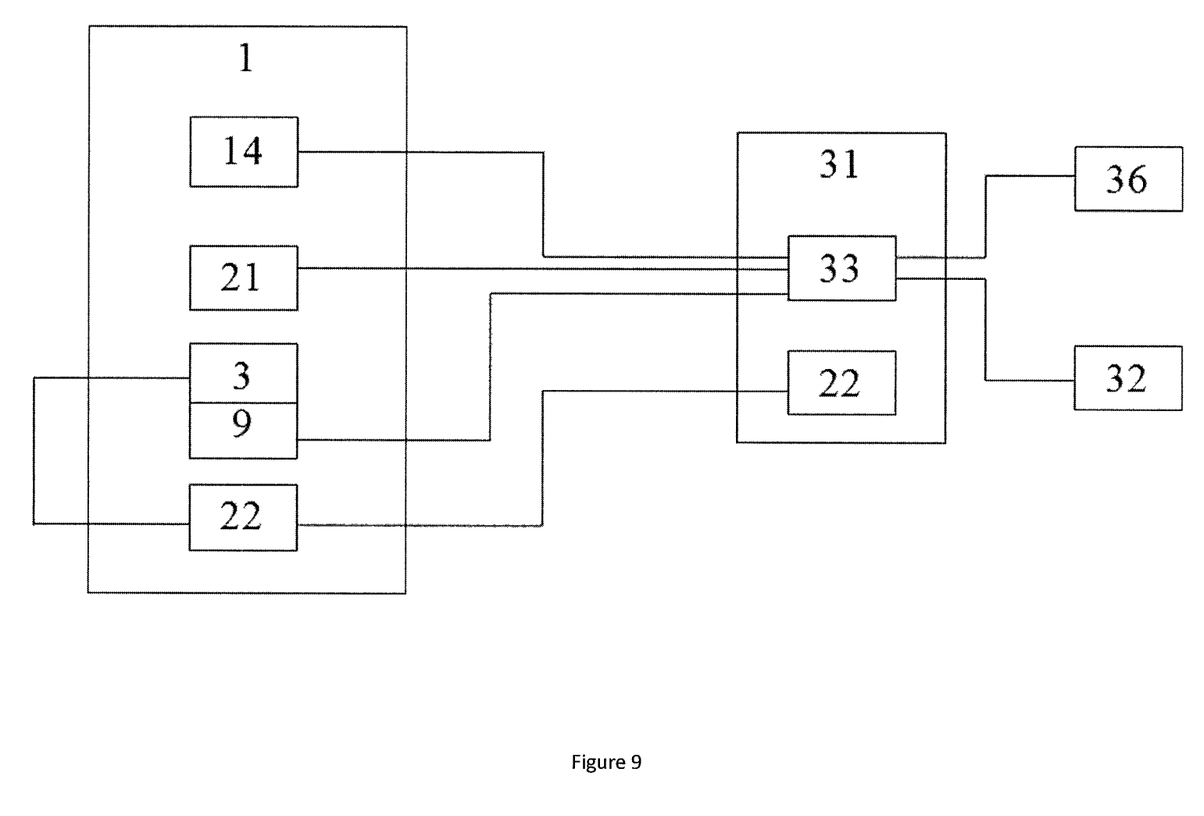
FIG. 9, block diagram for the nonintrusive inspection.

A computer management subsystem 33 commands and controls remotely all the subsystems of the whole ensemble: direction, engine speed and position of the system in the exclusion area, as well as the other connected peripherals according to the invention, communicating with them through a wireless LAN.

All the physical components of the computer management subsystem 33, as well as the operator's workstation are installed in a mobile control center 31 which during transport is towed by the chassis 1, and during the scanning process is located outside the exclusion area a.

The mobile scanning unit, according to the invention, has 2 physical presentation modes: scanning and transport. Commuting from one mode to another is realized by operating some hydraulic cylinders, cylinders that reconfigure the positions of the components.

Figure 6:
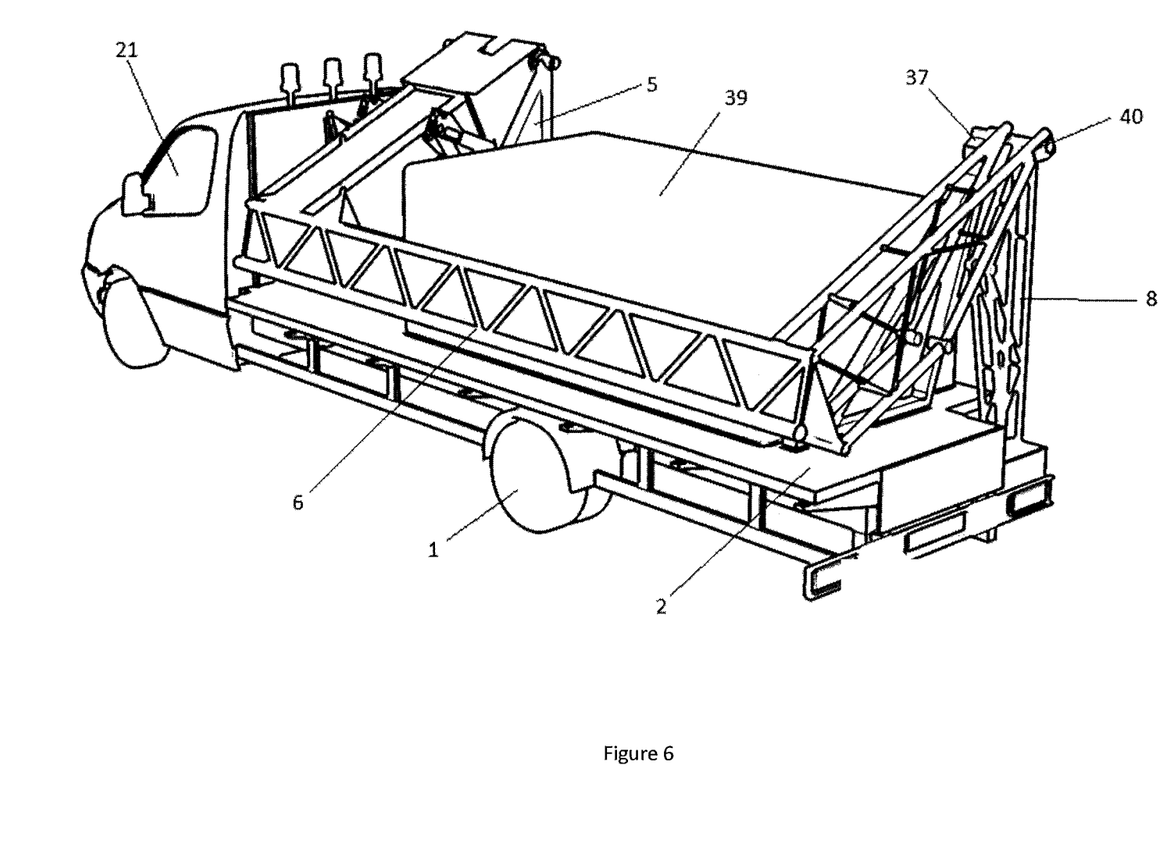
FIG. 6, side view of the nonintrusive inspection system, in transport mode.

In transport mode, the rotary segment 6 is folded along the superstructure 2 which is mounted on the chassis 1 while the detector boom 3 is folded in the form of the letter "C" to assure compliance with the dimensional legal limits of transport on public roads and also to allocate a good weight reparation on every wheel. The auxiliary wheel 34, located at the basis of the detector boom 3 is not operated by the hydraulic piston 35 and stays lifted by the chassis, never touching the ground. The automatic traffic management subsystem 36 components' are packed on the chassis' 1 platform and the mechanical switching box 16 is commuted in transport position, with the direct drive shaft link between the gearbox 12 and traction deck 13.

The mechanical switching box 16 commutes in scanning mode, so the drive shaft output from the gearbox 12 engages directly a hydraulic pump 19, connected hydraulically with a hydraulic motor 18, which is connected mechanically with the traction deck 13.

In "scanning mode", the auxiliary wheel 34 is lowered onto the ground, using the hydraulic piston 35, undertaking a part of the chassis' 1 weight, and the inclinometer 46 determines the inclination angle of the detector boom 3, said boom which needs to move in a vertical plan regardless of the encountered road surface. The final segment 8 stays locked in a vertical position on the superstructure 2 on the strength of the electromagnetic lock 37. The "C-shaped" rotary segment 6 executes an unfolding motion around the mast 5 which is fixed and around the final segment 8 which is also locked in the electromagnetic lock 37, and takes a vertical position in the same plan as the mast 5, forming a 90 degree angle between the chassis 1 plan and the final segment 8 plan, the boom taking the "upside down U" shape. Then, the final segment 8 is unlocked from the electromagnetic lock 37 which held it solidary to the chassis 1, becoming locked with the rotary segment 6 through another electromagnetic lock 38, said rotary segment 6 which executes a 90 degree rotation motion around the mast 5 along with the final segment 8, so that the systems extends its boom in the "upside down U" shape, at the chassis 1 right, the system reaching scanning mode.

The mobile control center 31 is located outside the exclusion area a, area which is delimited by the perimeter protection subsystem 32.

The chassis 1 has to be approved according to the international standards in force, which allow transport on public roads without a special authorization. The chassis 1 is provided with a superstructure 2, which holds all the components of the mobile scanning unit: the annexes of the hydraulic system such as the oil tank, distributors, safety and control circuits, electric and electronic circuit cabinets 39. Some of these subassemblies are not marked as they are believed to be components, well known and unclaimed.

The fixed segment of the detector boom, the mast 5, as well as the other segments are built from stainless steel, and its structure is designed so the total weight of the system is lowered, making it the lightest and mobile nonintrusive inspection system on the market today.

The mast 5 is mounted on the superstructure 2 by two joints, more precisely on the stabilizing system of the detector boom, on its right, behind the driver's cabin where the automated control of speed and direction subsystem is located. On top of the mast 5, the "C" shaped rotary segment 6 is fixed in a two degree joint 7. At the other end of the "C" shape, in a one degree rotary joint 40, the final segment 8 is located which holds at its inferior end the penetrating radiation source 9. The detector boom 3, composed of the said 3 segments rotates away from the chassis 1 and towards the scanning area and takes an upside down "U" shape.

Figure 5:
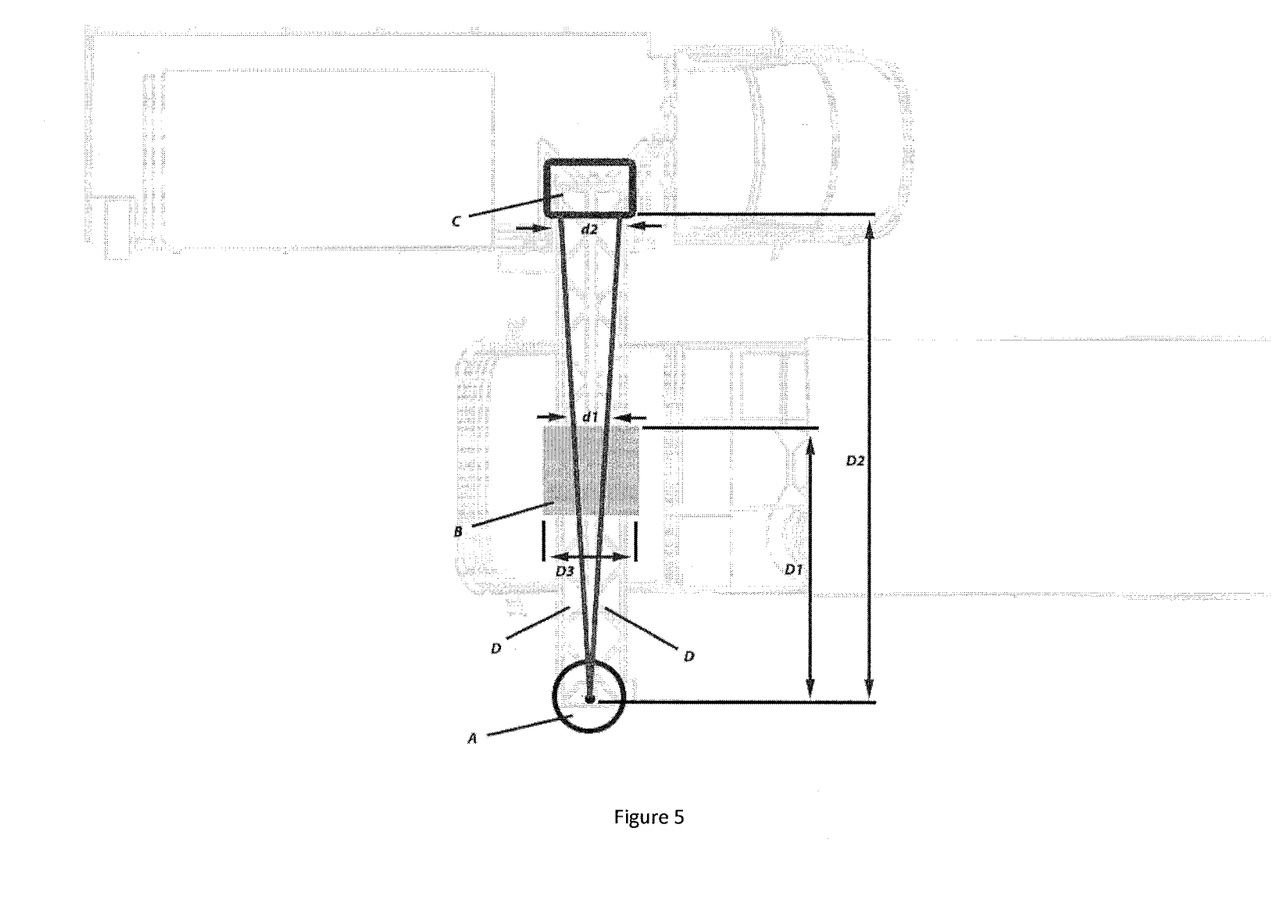
FIG. 5, the geometry of the scanning process.

The penetrating radiation source 9 is fixed at the inferior end of the third segment of the detector boom, the final segment 8, in a parallel plan with the chassis 1 plan, so that the beam of radiation b is collimated on the detectors area from the mast 5 and from part of the rotary segment 6. Depending on the chosen radiation source, the system according to the invention includes the detector area from the mast 5 and from part of the rotary segment 6, with the purpose of transforming the perceived penetrating radiation into electrical signals which are further processed and transformed in radiographic images of the scanned vehicle. Therefore, for an X-Ray generator, hybrid detectors with scintillation crystals and photodiodes or monolithic detectors with load coupled circuits will be used; in the case of a gamma radiation source, hybrid detectors with scintillation crystals coupled with photomultiplier tubes will be used. The detector alignment can be done, depending on the chosen radiation source and the constructive solution of the detectors on one row, 2 rows or in a variable dimensions matrix.

The perimeter protection subsystem 32 of the exclusion area a, is an active radiological protection subsystem which acts directly to the penetrant radiation source 9, so that the source 9 is automatically shut down in the case of breach of the exclusion area a, for protecting them against accidental radiation leaks. The active sensors that compose the perimeter protection subsystem are placed in pairs, at the extremities of the exclusion area a, oriented at 90 degrees one from the other, creating a virtual surface of 2 m high which defines a rectangular surface of maximum 20×20 square meters. These sensors are permanently connected, through radio, to the mobile control center 31, towards which they send an alarm signal in case intruders breach the area, said signal that shuts down automatically the source 9 and activates a text, vocal and graphical message on the graphical interface of the operator's software application, marking which side has been breached. The subsystem was designed to function in difficult meteorological conditions like rain, snow, wind, extreme temperatures, etc. The perimeter protection is deactivated so that it allows the entrance/exit in and from the exclusion area.

By using the drive-through method of inspection as well as other implementation method, the maximum dose of absorbed radiation by the driver of the vehicle is 0.078 μSv.

Figure 4:
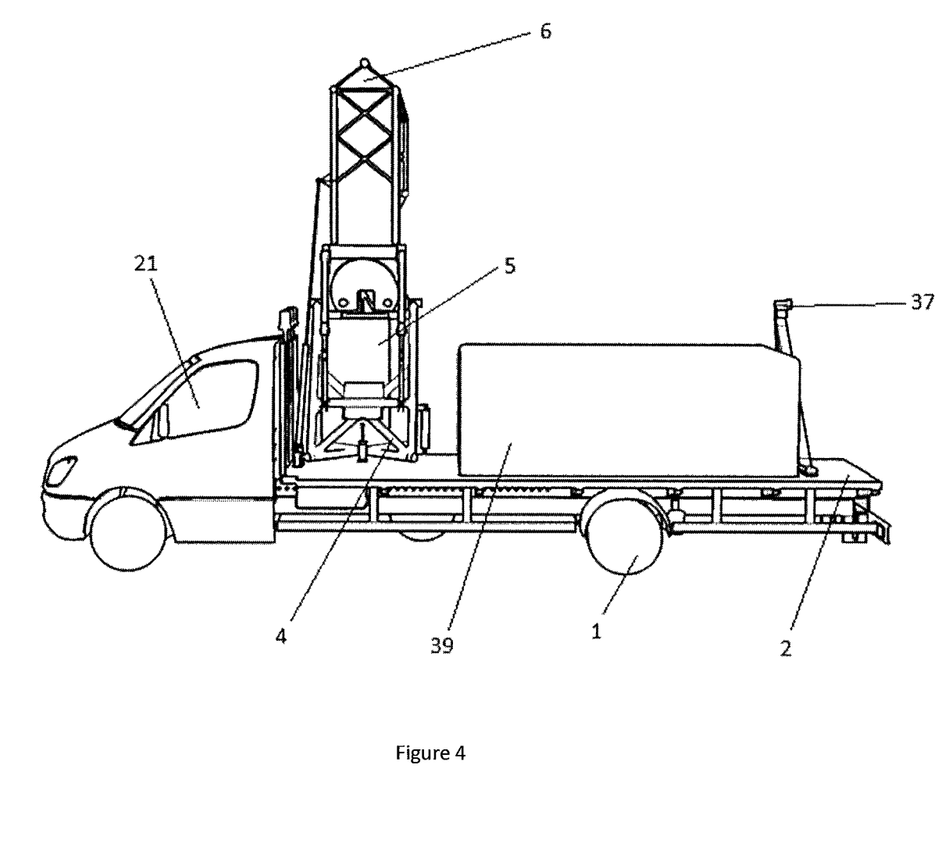
FIG. 4, left view of the driver's cabin in scanning mode.

In order to calculate the dose of radiation absorbed by the driver in scanning mode, the following variables are taken into account. In FIG. 4, the following are mentioned: a penetrating radiation source A, the area occupied by the scanned driver B, the detector block C and two penetrating radiation beams D which determine the following notations: d1 the beam's width at the driver's level and d2 the beam's width at the detectors level. D1 is the source-driver distance, D2 is the source-detectors distance and D3 is the space occupied by the driver. Two types of values are acknowledged: predefined (obtained by direct measurements, estimations, empirical methods) and calculated (using the predefined values in mathematical formulas). Thereby, the current intensity I from the generator is fixed at 0.5 mA, the source-detector distance D2 is 4.5 m, the source-driver distance D1 is 1.5 m (worst case scenario has been taken into account), the beam's with at the detectors d2 is 30 mm (chosen realistically for practical alignment), the space occupied by the driver D3 is 0.3 m, the driver's speed v through the radiation beam during the scanning process is 10 km/h (=2.78 m/s) and the scattered radiation coefficient c2 is 2%.

In order to determine the dose of radiation per scanning, the following mathematical formula is used:

Dose=(the dose rate at the driver's level)×(driver exposure time)×(surface coefficient)×(1+scattering coefficient), where:

The dose rate at the driver's level is calculated using this formula:

(the dose rate at the generator current)×(current intensity)/(distance source−driver)$^2$.

The dose rate at the X-Ray generator is obtained using a dedicated software application which calculates the breaking radiation spectrum (bremstrahlung) using as inputs the following parameters: the peak energy of 250 keV with a 2 mm Cu filter and as output the dose value given by the X-Ray generator at 1 m. After computation, the dose rate resulted is 96 [μSv/mAs] and knowing the current intensity and the generator-driver distance (1.5 m), dose rate at the driver's level is 21.33 [μSv/s].

The driver exposure time is calculated with the following formula:

(the space occupied by the driver/scanning speed) and equals 0.108 s.

The surface coefficient is obtained with the formula:

(the beam's width at the driver's level/the space occupied by the driver).

The beam's width is calculated with the formula: (the beam's width at the detectors×generator-driver distance)/(generator-detector distance) and equals 10 mm. So, the surface coefficient is 0.033.

Finally, the integrated dose rate per scanning process can be obtained and it equals 0.078 μSv.

According to the International Atomic Energy Agency (IAEA) no. 115 the occupational dose coming from a single source, maximum admissible for a person, is 0.3 [mSv/year], the equivalent of 3830 scans per year using the present invention (over 10 scans per day) and according to The National Committee for Nuclear Activities Control (CNCAN) NSR01/2000 from Romania, the occupational dose coming from a single source, maximum admissible for a person, is 1 [mSv/year], the equivalent of 12755 scans per year using the present invention (over 34 scans per day). Considering that the present invention is used in border control and in practice a driver passes through a boarder check-point a couple of times per day, he will never reach the maximum number of allowed scans using the present invention. If in some applications there is a risk of exceeding the scan limit calculated above, a system can be implemented, said system which stores all scanned drivers in a database and counts the number of times a driver passes through the scanner, transmitting a warning message to the operator when the scanning limit has been reached.

Using a sequential control scanning method, apart from the perimeter protection subsystem 32, the system also comprises of an automated traffic management subsystem 36 which operates the barriers 41 and 42 and the traffic lights 43 and 44 situated at the entrance and at the exit of the scanning area, in order to control the vehicle access. This subsystem is controlled automatically by the specialized software application. State information about the barriers and the traffic lights are displayed on the operator's graphical interface. The orders and the state information are transmitted through appropriate interfaces and through radio modems.

The mobile control center 31 operated all the components and the peripherals that compose the mobile scanning system, assuring the automation of the processes.

What is claimed:

1. A nonintrusive drive through inspection method for vehicle scanning using radiation, comprising of the following steps:
   a) arranging one or more vehicles in a row, to await the scanning process;
   b) driving a first vehicle into an exclusion area, that is protected by an automated perimeter protection system;
   c) driving the first vehicle to a scanning structure at a recommended speed, said speed being displayed on an external display system to which the vehicle driver has visual access;
   d) activating a radiation source of the scanning structure if the first vehicle maintains the recommended speed in the vicinity of a portal and if the end of the scanning structure is detected using a specialized system;
   e) passing the first vehicle through the scanning structure, the scanning structure having on one side a low intensity radiation source for creating an image;
   f) displaying the image of the inspected vehicle created on an operator's screen simultaneous and synchronized with the vehicle's movement;
   g) stopping automatically the scanning if:
      a. the scanned vehicle has passed completely by the extremity of a boom that holds radiation detectors, or
      b. intruders breach the exclusion area, or
      c. a proximity sensor is triggered, which transmits an alarm signal when the distance between the detector boom and the scanned vehicle is dangerously small, or
      d. the scanned vehicle's speed drops under the recommended speed, such as to expose the driver and any passenger to a higher radiation dose;
   h) wherein, after the first vehicle has been scanned, a second vehicle is driven by its driver into the scanning area and the scanning process is continued; and
   i) at the end of the scanning process, the automatic perimeter protection system of the exclusion area is deactivated right after the radiation source is deactivated.

2. A nonintrusive inspection system, comprising a mobile scanning unit on a chassis (1), wherein a superstructure (2) is mounted, said superstructure provided with a detector boom (3) which comprises several segments: a fixed mast (5) mounted on the lateral and superior part of the superstructure (2) on a stabilizing system of the detector boom (3), a "C" shaped rotary segment (6) which is fixed in a two degree joint (7) to a mast (5) which allows folding and rotating, and a final segment (8) fixed in a one degree rotary joint (40) on one end of the rotary segment (6), said other segment holding, at its inferior end, a penetrating radiation source (9), wherein the segments of the detector boom (3) are assembled in an upside-down "U shaped form ".

3. A nonintrusive inspection system as set forth in claim 2 wherein the system can be rapidly prepared for transport by folding a rotary segment (6) along a superstructure (2) mounted on a chassis (1), a detector boom (3) taking a "C" shape which assures the minimum gauge that would allow the enrolment of the vehicle in the authorized dimensions of public road transport and in fitting the inspection system into and ISO standardized container.

4. A nonintrusive inspection system as set forth in claim 2 wherein the system is provided with a stabilizing image system which supports a detector boom (3) and an auxiliary wheel (34), geared with a hydraulic piston (35) and an inclinometer (46) which constantly measures the degree of inclination of the boom (3), said wheel which is lowered at ground level before the scanning process starts with the purpose of counterbalancing the weight of the chassis by overtaking a part of its weight in the scanning process and to continuously gear the detector boom (3) in a rotary motion in a perpendicular plan with the transversal axis of the chassis, so that the boom stays relatively still in vertical plan, regardless of the surface the scanning takes place.

\* \* \* \* \*